(12) United States Patent
Takeuchi et al.

(10) Patent No.: US 7,616,857 B2
(45) Date of Patent: Nov. 10, 2009

(54) OPTICAL FIBER ARRAY SUBSTRATE

(75) Inventors: Hirokazu Takeuchi, Otsu (JP); Nobuo Funabiki, Otsu (JP); Kazuya Saito, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 12/036,108

(22) Filed: Feb. 22, 2008

(65) Prior Publication Data

US 2008/0159705 A1     Jul. 3, 2008

Related U.S. Application Data

(63) Continuation of application No. 10/507,955, filed as application No. PCT/JP03/03053 on Mar. 14, 2003, now Pat. No. 7,406,243.

(30) Foreign Application Priority Data

Mar. 15, 2002  (JP)  ............................. 2002-072098
Jun. 12, 2002  (JP)  ............................. 2002-171141
Jun. 28, 2002  (JP)  ............................. 2002-189090

(51) Int. Cl.
    G02B 6/00         (2006.01)
(52) U.S. Cl. ...................... 385/137; 385/134; 385/136
(58) Field of Classification Search ................. 385/137, 385/134, 136
    See application file for complete search history.

(56) References Cited

U.S. PATENT DOCUMENTS

| 5,199,966 A * | 4/1993 | Harvey et al. .................. 65/407 |
| 6,226,429 B1 * | 5/2001 | Hikita et al. ................... 385/50 |
| 6,249,619 B1 * | 6/2001 | Bergmann et al. ............ 385/11 |
| 2002/0028036 A1 * | 3/2002 | Kato ............................ 385/18 |

FOREIGN PATENT DOCUMENTS

| EP | 0947867 A2 * | 6/1999 | .................. 385/53 |
| JP | 409145948 A * | 6/1997 | .................. 385/54 |
| JP | 410020141 A * | 1/1998 | .................. 385/54 |

* cited by examiner

*Primary Examiner*—Frank G Font
*Assistant Examiner*—Jerry Blevins
(74) *Attorney, Agent, or Firm*—J.C. Patents (57) ABSTRACT

An optical fiber array substrate 11 has, in one surface thereof, eight V-grooves 12 for securing eight optical fibers 14 aligned in parallel to each other, and V-shaped side grooves 13 formed outside of the respective outermost V-grooves 12 located at the opposite sides of the substrate 11. The apexes of the outside ridges 12c and 12d defining the outermost V-grooves 12 are at the same height as the apexes of the inside ridges 12a and, the height of the bottom 13a of the side groove 13 is lower than that of a contact point 12e between the ridge line of the V-groove 12 and optical fiber 14.

8 Claims, 9 Drawing Sheets

OPTICAL FIBER ARRAY SUBSTRATE

CROSS-REFERENCE TO RELATED APPLICATIONS

This application is a continuation of application Ser. No. 10/507,955 with a 371(c) date of Feb. 7, 2005, now U.S. Pat. No. 7,406,243, which is a national phase application of international application No. PCT/JP03/03053 filed on Mar. 14, 2003, which in turn claims the priority benefits of Japan application No. 2002-72098 filed on Mar. 15, 2002, Japan application No. 2002-171141 filed on Jun. 12, 2002, and Japan application No. 2002-189090 filed on Jun. 28, 2002. The contents of these prior applications are hereby incorporated by reference in its entirety.

BACKGROUND OF THE INVENTION

The present invention relates to an optical fiber array substrate used in an optical device connecting a plurality of optical fibers and has securing grooves for receiving and positioning a plurality of optical fibers, and also to a method for producing the same.

In late years, there has been an increased demand for high-capacity and high-speed optical communication networks and optical devices of the optical fiber array type have been brought to attention. Typically, in such devices, a plurality of optical fibers are aligned by using a substrate having linear V-grooves, and such substrate is fabricated by a fabrication method such as press working, shaving or grinding of a plate material, or directional etching of a silicon single-crystal plate material.

However, in order to satisfy a severe dimensional accuracy required for optical fiber array substrates by means of the fabrication method as mentioned in the above, it is required to grind V-grooves precisely with high angular accuracy one by one, to finish the V-grooves with desired height and desired interval therebetween. Therefore, there are problems that the methods require many steps and are complicated, hence non-defective fraction is not increased so that costs are expensive.

In an optical fiber array substrate manufactured according to the method as described above, since the surfaces of linear V-grooves are rough and the shape of the regions between the V-grooves are too sharp, optical fibers may be damaged when mounting and also the optical fiber array substrate itself may be apt to be damaged or chipped. Therefore, it becomes concerned that the substrate may be decreased in breakage resistance to be broken. Moreover, the V-grooves, which are finished after a lot of work, may be damaged during working process or following cleaning process. Further, the bottom or top of the V-grooves may be cracked during grinding process and the like, and thereby breakage resistance of the substrate may be lowered. Thus, the optical fiber array substrate may often be broken during handling so that the yield is lowered. Therefore the production efficiency of such optical fiber array substrates is so low that they are not suitable for mass production.

Japanese Patent Laid-Open Publication No. Hei 2-13913 discloses a fabrication method of an optical fiber array substrate in which a glass base material is heated and softened to be drawn (i.e. to be drawn and formed) to a dimension of 1/10. However, since the base material actually is softened and deformed during the drawing process, it is difficult to keep the shape and to control the dimensional accuracy. As a result, the shape of the V-grooves becomes to be deformed, particularly the shape of the outside V-grooves becomes to be deformed significantly. In addition, the heights of the V-grooves become to be not uniform due to variations thereof. Thus, such optical fiber array substrates do not wear for applications requiring high accuracy. More specifically, in a substrate formed by the conventional drawing process, the surface of the base material where the V-grooves are formed is slightly elongated when heated and softened, so that the central portion of the surface is deformed to cave in the order of several micrometers. As a result of this deformation, the V-grooves in the central portion become to be lower than the V-grooves in the peripheral portion by several micrometers. When optical fibers are arranged in such V-grooves, the heights at the centers of the cores of the optical fibers become to vary by several micrometers, so that it is very difficult to fabricate a high precision substrate with V-grooves.

Figure 9A:
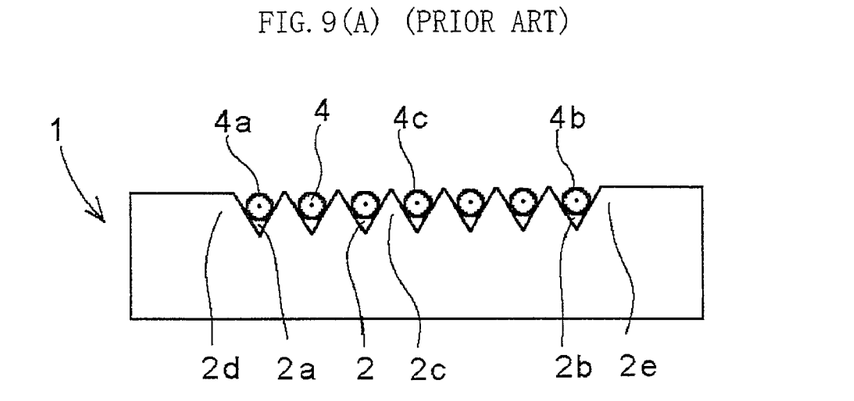
FIG. 9 shows a conventional optical fiber array substrate.

Further, in a conventional optical fiber array substrate 1 as shown in FIG. 9(A), outside ridges 2d and 2e defining outermost V-grooves 2a and 2b of optical fiber securing V-grooves 2 are greatly different in shape from inside ridges 2c. Therefore, when optical fibers 4 are adhered to the optical fiber array substrate 1 by the use of a thermosetting adhesive, or when they have been arranged as an optical fiber array, a difference in heat history between the outside optical fibers 4a, 4b and the inside optical fibers 4c which are supported in the V-grooves 2 is generated due to a difference in heat capacity between the outside ridges 2d, 2e and the inside ridges 2c, which will be a factor to lower the reliability of the optical fiber array.

Figure 9B:
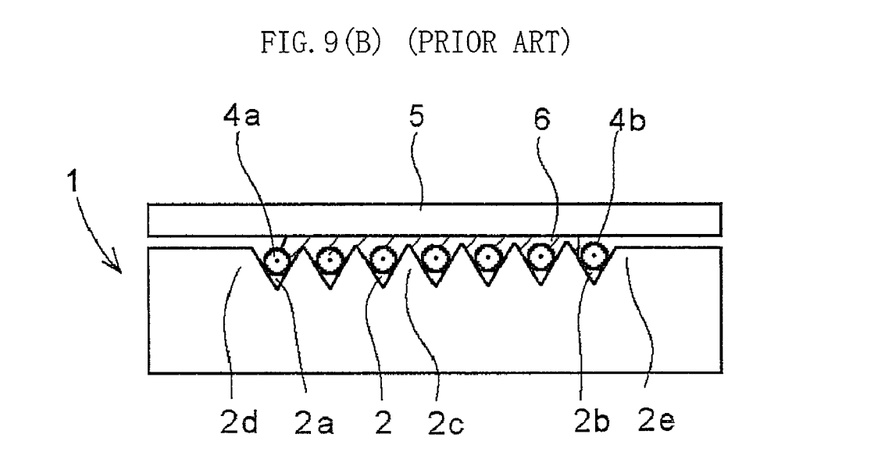
Figure 9C:
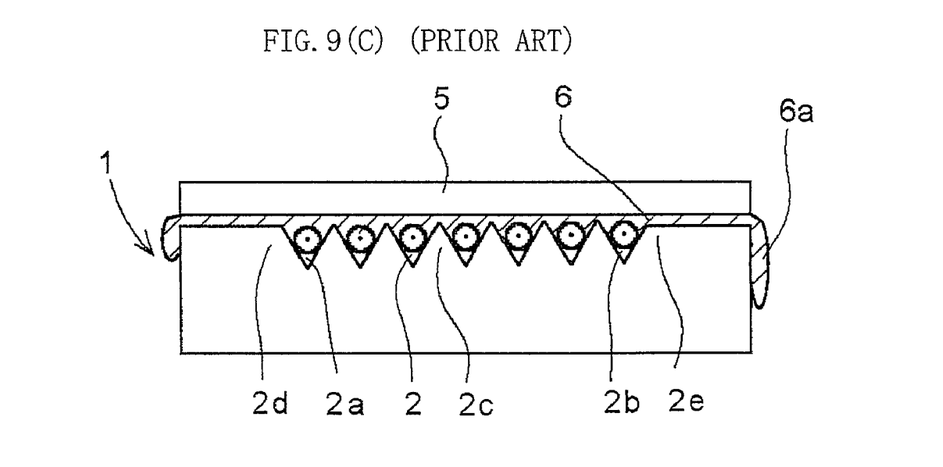

Furthermore, in the conventional optical fiber array substrate 1 as shown in FIG. 9(B), when the optical fibers 4 are held down by a plate 5 and fixed with an adhesive 6, if the amount of the adhesive is too small, there is a problem that some of the optical fibers 4 will not be fixed completely, because of the adhesive 6 not being distributed sufficiently to the fixing portions for all of the optical fibers. On the contrary, if the amount of the adhesive is too large, the adhesive 6 will run off from the side of the substrate 1, as shown in FIG. 9(C), so that troublesome tasks such as scraping the run-off adhesive 6a or polishing the sides of the substrate 1 will be required to comply with the predetermined dimension. Therefore, there is a problem that the amount of adhesive is required to be controlled strictly.

SUMMARY OF THE INVENTION

The present invention has been accomplished in view of the aforementioned problems, and an object of the present invention is to provide an optical fiber array substrate having a high accuracy to correspond to high-speed and high-capacity optical communication applications and still causing no damage to the optical fiber array substrate and optical fibers mounted thereon, and also to provide a method for producing such an optical fiber array substrate affording high production efficiency and suitable for mass production.

An optical fiber array substrate according to the present invention is made of glass or crystallized glass in which crystals are precipitated in amorphous glass and has a plurality of optical fiber securing grooves formed therein, and is characterized in that at least an apex-side portion, extending from a contact point with an optical fiber, of an outside ridge defining an outside optical fiber securing groove has substantially the same shape as an apex-side portion, extending from the contact point with the optical fiber, of an inside ridge.

If the apex of the outside ridge defining the outside optical fiber securing groove is located at a different height from that of the apex of the inside ridge, or if an outside lower portion of the outside ridge defining the outside optical fiber securing groove is located not lower than the height of the contact point between the ridge line defining the groove and the optical fiber, the shape of the outside ridge with respect to the apex-side portion (upper portion) extending from the contact point between the optical fiber and the groove is different from the shape of the inside ridge. Thereby, when optical fibers are adhered to the optical fiber array substrate by the use of a thermosetting adhesive, or when they have been arranged as an optical fiber array, a difference in heat history between the outside optical fibers and the inside optical fibers which are supported in the grooves is generated due to a difference in heat capacity between the outside ridges and the inside ridges, which will be a factor to lower the reliability of the optical fiber array. In the optical fiber array substrate according to the present invention, the apex of the outside ridge defining the outside optical fiber securing groove is located at substantially the same height as that of the apex of the inside ridge, and the outside lower portion of the outside ridge defining the outside optical fiber securing groove is located lower than the height of the contact point between the ridge line defining the groove and the optical fiber, so that the optical fiber array thus produced will not exhibit large difference in thermal history caused by difference in thermal capacity of the ridges, between the outside optical fibers and the inside optical fibers secured in the grooves.

Further, in the optical fiber array substrate according to the present invention, since the outside ridge defining the outside optical fiber securing groove may have substantially the same shape as the inside ridges, the optical fiber array produced will hardly exhibit difference in thermal history caused by difference in heat capacity of the ridges, between the outside optical fibers and the inside optical fibers secured in the grooves.

In the above constitution, the cross sectional shape of each of the side surfaces of the substrate parallel to the grooves may be a convexly rounded shape.

The convexly rounded shape defining the cross sectional shape of the side surface of the substrate may be any convex shape with curvature so far as it is continuous and has no irregular depression or the like. Although the shape is not limited to any specific shape, partially cylindrical surfaces for example are suitable for convenience of dimensional control. As a result of each of the side surfaces of the substrate having a convexly rounded cross sectional shape in this way, the substrate has no angular corners with an angle of about 90 degrees and hence no portion where stress would be concentrated, whereby the resistance to breakage of the substrate is enhanced. In addition, even if the substrate is hit or dropped during handling, the substrate is difficult to be chipped or cracked. Furthermore, the generation of defectives due to chips or flaws of the corners can be decreased dramatically so that the yield for assembling an optical device can be improved.

In the constitution above, a hole substantially parallel to the grooves may be provided in the interior of the substrate.

By inserting a guide pin into the hole of the substrate, or filling the hole with adhesive, solder or the like when assembling an optical device, it is made possible to assemble the optical fiber array substrate to another optical fiber array substrate or to a waveguide easily and securely with a minimum gripping margin. Further, when the optical fibers are adhesively set by thermosetting adhesive or the like, the temperature all over the optical fiber array substrate can be easily made uniform. Therefore, it is possible to eliminate concentration of stress generated during the setting of the adhesive to some of the optical fibers and also possible to prevent deterioration or optical properties.

As the hole provided in the interior of the substrate, a hole having a substantially elliptical cross section or having a substantially circular cross section may be employed or example. In case of employing a hole with a substantially circular cross section, a plurality of such holes may be provided in the interior of the substrate. The hole passes through the interior of the substrate and one end or both ends thereof open(s) at the end surface(s) of the substrate. Preferably, the hole has a constant cross sectional area along the direction substantially parallel to the grooves of the substrate.

If the cross sectional shape of the hole is substantially elliptical, the temperature of the whole substrate can be made still more uniform when the optical fibers are adhesively set by thermosetting adhesive. Therefore it is possible to eliminate concentration of stress generated during the setting of the adhesive to some of the optical fibers and also possible to prevent deterioration of optical properties.

Further, in case when a plurality of holes each having a substantially circular cross section are provided, guide pins each having a circular cross section and a predetermined diameter can be inserted into the holes respectively, during the assembling of a optical device, so that the optical fiber array substrate can be assembled easily, stably and accurately with another optical fiber array substrate or a waveguide.

Preferably, a side groove with a predetermined volumetric capacity is provided at the outside of the aforementioned outside ridge. The side groove serves as a reservoir for adhesive used for adhering the optical fibers in the optical fiber securing grooves, and therefore even if rather excessive amount of adhesive is used during the adhesion of the optical fibers with adhesive, there is no worry that the adhesive will run off from side surface of the optical fiber array substrate. Thus strict control of the amount of adhesive is not required. As a result, the work to adhesively setting the optical fibers is simplified and the yield can be improved.

The apexes of the ridges defining the optical fiber securing grooves are preferably flat surfaces. By forming the apexes of the ridges into flat surfaces, it is possible to prevent the ridges from being chipped or otherwise damaged when optical fibers are mounted in the grooves or the end surface of the optical fiber array substrate is polished, and hence no minute chips will be created by chipping.

It is also preferable for mounting and securing the optical fibers in the grooves stably that the distance from the apexes of the ridges to a line connecting the centers or the optical fibers mounted in the grooves is less than or equal to 52.5 µm. If the apexes of the ridges are separated upwards from the line connecting the centers of the optical fibers mounted in the grooves by a distance exceeding 52.5 µm, it will become impossible to fix the optical fibers with pressing them against the side faces of the grooves, depending upon the surface roughness or flatness or a flat plate that is used to hold down the optical fibers to be mounted and fixed in the grooves to retain the height of the optical fibers at a constant level, and it may result in variation in the height of the optical fibers. On the other hand, if the apexes of the ridges are separated downwards from the line connecting the centers of the optical fibers mounted in the grooves by a distance exceeding 52.5 µm, there is a possibility that the optical fibers may not be received in the grooves properly to come out therefrom when mounting and fixing the optical fibers to the grooves.

It is important that the optical fiber array substrate according to the present invention is made of glass or crystallized glass in which crystals are precipitated in amorphous glass. The optical fiber array substrate made of glass or crystallized glass in which crystals are precipitated in amorphous glass exhibits polishing properties similar to optical fibers. Therefore, after the optical fibers are fixed thereto, it is easy to polish the end surfaces of the optical fibers at high accuracy. In addition, when the optical fiber array substrate is made of glass that is transparent to ultraviolet light or the like, it is possible to fix the optical fibers by applying a photo-curing resin on the grooves, mounting optical fibers therein, and applying ultraviolet light or the like to the resin through the optical fiber array substrate.

It is preferable that the optical fiber array substrate according to the present invention is produced by drawing a base material. For example, a base material having linear grooves formed therein by means of cutting is thermally softened to be drawn and formed, whereby the linear grooves are thermally softened to diminish generation of flaws or chips in the optical fiber array substrate and the optical fiber array substrate becomes difficult to break. Further, the optical fibers are also hardly damaged when mounted on the optical fiber array substrate.

Since the base material, whose cross sectional dimension is several tens times greater than the optical fiber array substrate to be formed, is drawn and formed, the dimensional accuracy required for the linear grooves previously formed in the base material is moderated several tens times as compared with the optical fiber array substrate, and hence the base material can be worked easily without using any special working devices or the like. For this reason, it is possible to reduce remarkably the labor and costs required for the working process. Further, the interval between the linear grooves can be varied freely by changing the reduction rate during the drawing process.

Since the surface of the optical fiber array substrate produced by drawing is a fire-polished smooth surface, the surfaces of the optical fibers will be hardly damaged when they are mounted later. In addition, flaws on the substrate surface formed during cutting or the like will disappear, and such a trouble that the optical fiber array substrate itself is broken will be almost eliminated.

In addition, since in the drawing process, the base material is thermally softened, drawn, and then quenched, a compression stress layer having a stress of about 10 MPa is formed in the surface of the optical fiber array substrate thus formed. As a result, the strength of the optical fiber array substrate is increased so that sufficient strength can be maintained even if the optical fibers are repeatedly moved in the grooves.

The mechanical strength is thus enhanced by the compression stress layer, whereby the optical fiber array substrate, even if having rather flaws or the like, will not be broken or chipped when subjected to a severe thermal shock or to an external force during handling, and therefore, the optical fiber array substrate can be handled easily.

Further, an optical fiber array substrate according to the present invention is made from glass or crystallized glass in which crystals are precipitated in amorphous glass, having a plurality of optical fiber securing grooves formed therein, and is characterized in that a cross sectional shape of each of side surfaces of the substrate parallel to the grooves is a convexly rounded shape.

Also in this optical fiber array substrate according to the invention, the following constitutions may be employed for the reasons as mentioned in the above:
(1) a hole substantially parallel to the grooves is provided in the interior of the substrate;
(2) a side groove with a predetermined volumetric capacity is provided at the outside of the outside ridge defining the outside optical fiber securing groove;
(3) the apexes of the ridges defining the grooves are flat surfaces;
(4) the distance from the apexes of the ridges to a line connecting the centers of the optical fibers mounted in the grooves is less than or equal to 52.5 µm; or
(5) the optical fiber array substrate is produced by drawing a base material made of glass or crystallized glass in which crystals are precipitated in amorphous glass.

Further, the optical fiber array substrate according to the present invention is made of glass or crystallized glass in which crystals are precipitated in amorphous glass, having a plurality of optical fiber securing grooves formed therein, and is characterized in that a hole substantially parallel to the grooves is provided in the interior of the substrate.

Also in this optical fiber array substrate according to the invention, the following constitutions may be employed for the reasons as mentioned in the above:
(1) a cross sectional shape of the hole is substantially elliptical;
(2) a cross sectional shape of the hole is substantially circular, and a plurality of such holes are provided;
(3) a side groove having a predetermined volumetric capacity is provided at the outside of the outside ridge defining the outside optical fiber securing groove;
(4) the apexes of the ridges defining the optical fiber securing groove are flat surfaces;
(5) the distance from the apexes of the ridges to a line connecting the centers of the optical fibers mounted in the grooves is less than or equal to 52.5 µm; or
(6) the optical fiber array substrate is produced by drawing a base material made of glass or crystallized glass in which crystals are precipitated in amorphous glass.

A preferred configuration for the optical fiber array substrate produced by drawing the base material is such that in the direction perpendicular to one surface of the substrate where the grooves are provided (in the height direction), the ratio of the dimension in the height direction of the aforementioned hole in the interior of the substrate to the dimension in the height direction of the substrate (dimension in the height direction from the other surface where no grooves are provided to the apexes of the ridges in the one surface where the grooves are provided) is 10% or greater.

According to the above preferred configuration, by controlling a gas pressure in the hole appropriately during the drawing process, a concave deformation of the one surface of the substrate, which is apt to be generated during the drawing process, can be prevented. If the aforementioned ratio is less than 10%, the concave deformation of the one surface of the substrate during the drawing process may not be avoided sufficiently.

A further preferred configuration of the optical fiber array substrate produced by drawing the base material is such that, in addition to the aforementioned ratio, in the direction parallel to the one surface of the substrate where the grooves are provided (in the width direction) the ratio of the dimension in the width direction of the hole in the interior of the substrate to the dimension in the width direction of the region formed with the grooves in the one surface of the substrate (dimension in the width direction from the outermost edge of the outside groove at one side to the outermost edge of the outside groove at the other side) is 20% or greater.

If the ratio is less than 20%, the concave deformation of the one surface of the substrate may not be able to be corrected over a sufficient range of the region formed with the grooves, and consequently variation in the height of the grooves may not be able to be decreased. In the case of eight optical fibers at 0.250 mm pitch, for example, the dimension in the width direction of the region formed with the groove in the one surface of the substrate is 0.250×8=2.0 mm. When a plurality of holes is provided, the dimension in the width of the holes is a sum of the dimensions in the width of the respective holes.

An optical fiber array substrate according to the present invention can be produced by a producing method as follows. Firstly, a base material made of glass or crystallized glass and having a plurality of linear grooves formed in one surface thereof is prepared. At this time, at least an apex-side portion, extending from a contact point with an optical fiber, of an outside ridge defining the outside groove, which is formed in the one surface of the base material and is to be an optical fiber securing groove after forming, is formed so as to have substantially the same shape as an apex-side portion, extending from the contact point with the optical fiber, of an inside ridge. Next, the base material is gripped by a gripping part of feeding means and fed into a heating furnace so that the base material is heated to a predetermined temperature and drawn and formed while drawing a lower part of the base material by drawing means. A formed body obtained by drawing in this way is then cut into a predetermined length to provide a longer body having a substantially similar shape to that of the base material and having a size in a desired range. Thereafter, this longer body is cut into a desired length.

In the process of preparing the base material, since at least the apex-side portion, extending from the contact point with the optical fiber, of the outside ridge defining the outside groove, which is formed in the one surface of the base material and is to be the optical fiber securing groove after forming, is formed so as to have substantially the same shape as the apex-side portion, extending from the contact point with the optical fiber, of the inside ridge, the outside optical fiber securing groove can be formed as accurately as the inside grooves, without deformation. Preferably, the outside ridge defining the outside groove to be the outside optical fiber securing groove after forming is formed so as to have substantially the same shape as the inside ridge.

In the aforementioned constitution, a cross sectional shape of each of side surfaces of the base material parallel to the grooves is preferable to be formed in a convexly rounded shape.

If the side surfaces of the base material are flat surfaces, the side surfaces of the base material are heated non-uniformly during the drawing process so that the cross sectional shape of the formed body may be apt to be deformed due to generation of large temperature distribution in the side surfaces. On the contrary, when the cross sectional shape of the side surfaces of the base material are convexly rounded, the side surfaces of the base material are apt to be heated uniformly. Therefore, even if surface tension is applied on the side surfaces of the base material when softened, an accurate dimensional stabilization of the formed body becomes to be possible and hence highly accurate optical fiber array substrates can be produced with high efficiency. Further, the control of the maximum dimension between the side surfaces of the formed body enables the dimensions of the formed body to be controlled accurately, and hence highly accurate optical fiber array substrates can be produced with high efficiency. Still further, as mentioned in the above, it is also able to enhance the breakage resistance of the base material, to prevent the base material from being chipped or cracked, and to improve the yield of the substrates.

Further, in the constitution as described in the above, it is preferable that a hole substantially parallel to the grooves is provided in the interior of the base material.

It is made possible to produce an optical fiber array substrate efficiently, by previously forming a hole along the longitudinal direction of the grooves in the interior of the base material to be drawn and formed.

It is also preferable that an inner diameter of the hole in the base material is varied during the drawing process, or that a gas pressure in the hole in the base material is controlled during the drawing process.

For example, a hole having a substantially constant cross sectional area along the longitudinal direction of the grooves is formed passing through the interior of the base material, and the hole is changed to an arbitrary size during the drawing process, whereby any concavity in the one surface of the substrate where the grooves are formed can be corrected. In particular, the diameter of the hole can be increased by pressurizing to make the gas pressure in the hole of the base material higher than the atmospheric pressure during the drawing process, so that any concavity can be corrected around the region closest, in direct distance, to the hole on the one surface of the substrate. On the other hand, by depressurizing in the hole, the diameter of the hole also can be decreased. In this manner, the height of the optical fiber array substrate can be varied freely, variation in the height of the grooves can be decreased, and thus it is possible to produce optical fiber array substrates with high dimensional accuracy.

In addition, a width of the optical fiber securing groove can be varied arbitrarily by changing a reduction ratio of the cross section of the longer body to the cross section of the base material during the drawing process. Therefore, since the interval between the grooves of the optical fiber array substrate can be varied, the grooves with various intervals required in accordance with optical fibers to be mounted can be manufactured easily, quickly and inexpensively without the need of new equipment such as molds or the like. Further, the temperature of the base material can be adjusted to control the viscosity thereof during the drawing process, so that the shape and intervals of the grooves can be varied minutely.

Further, the optical fiber array substrate according to the present invention can be also produced by a producing method as follows. That is, a method for producing an optical fiber array substrate, comprising the steps of, preparing a base material made of glass or crystallized glass, the base material having a plurality of linear grooves formed in one surface thereof, gripping the base material by a gripping part of feeding means and feeding it into a heating furnace so that the base material is heated to a predetermined temperature, drawing the base material while drawing a lower part of the base material by drawing means to obtain a formed body, cutting the formed body into a predetermined length to provide a longer body having a substantially similar shape to the base material and having a size in a desired range, and cutting the longer body into a desired length, wherein in the step of preparing the base material, a cross sectional shape of each of side surfaces of the base material parallel to the grooves is a convexly rounded shape.

Also in this manufacturing method, the following constitutions can be employed:

(1) a hole substantially parallel to the grooves is provided in the interior of the substrate;

(2) an inner diameter of the hole in the base material is varied during the drawing process, or a gas pressure in the hole in the base material is controlled during the drawing process; or (3) a width of the optical fiber securing groove is varied arbitrarily by changing a reduction ratio of the cross section of the longer body to the cross section of the base material during the drawing process.

Still further, the optical fiber array substrate according to the present invention also can be produced by a producing method as follows. That is, a method for producing an optical fiber array substrate, comprising the steps of, preparing a base material made of glass or crystallized glass, the base material having a plurality of linear grooves formed in one surface thereof, gripping the base material by a gripping part of feeding means and feeding it into a heating furnace so that the base material is heated to a predetermined temperature, drawing the base material while drawing a lower part of the base material by drawing means to obtain a formed body, cutting the formed body into a predetermined length to provide a longer body having a substantially similar shape to the base material and having a size in a desired range, and cutting the longer body into a desired length, wherein in the step of preparing the base material, a hole substantially parallel to the grooves is provided in the interior of the base material.

Also in this manufacturing method, the following constitutions can be employed:

(1) an inner diameter of the hole in the base material is varied during the drawing process, or a gas pressure in the hole in the base material is controlled during the drawing process; or
(2) a width of the optical fiber securing groove is varied arbitrarily by changing a reduction ratio of the cross section of the longer body to the cross section of the base material during the drawing process.

In the producing method according to the present invention, since the base material with great dimension, whose cross section area is several tens times greater than the optical fiber array substrate, is drawn and formed, the dimensional accuracy required for the linear grooves previously formed in the base material is moderated several tens times as compared with the optical fiber array substrate. Therefore, the base material can be worked easily without using any special working devices or the like. For this reason, it is possible to reduce remarkably the labor and costs required for the working process.

As described in the above, with the optical fiber array substrate and the producing method thereof according to the present invention, it is possible to provide an optical fiber array that has high accuracy and high strength corresponding to high-speed and high-capacity optical communication applications and that is still inexpensive.

BRIEF DESCRIPTION OF THE DRAWINGS

FIG. 1 shows an optical fiber array substrate according to a first embodiment, FIG. 1(A) being a perspective view, FIG. 1(b) being a side view, and FIG. 1(C) being an enlarged photograph of V-grooves;

FIG. 2 shows an optical fiber array substrate according to a second embodiment, FIG. 2(A) being a perspective view, FIG. 2(B) being a side view, and FIG. 2(C) being an enlarged photograph of V-grooves;

FIG. 3 shows an optical fiber array substrate according to a third embodiment, FIG. 3(A) being a perspective view, FIG. 3(B) being a side view, and FIG. 3(C) being a side view illustrating the state where optical fibers are adhered by an adhesive;

FIG. 4 includes enlarged side views of V-grooves, FIG. 4(A) illustrating an optical fiber array substrate with an interval P between the V-grooves being 127 μm, and FIG. 4(B) illustrating an optical fiber array substrate with an interval P between the V-grooves being 250 μm;

FIG. 5 shows an optical fiber array substrate according to a fourth embodiment, FIG. 5(A) through FIG. 5(D) respectively showing different examples exemplifying different centers of curvatures of the side surfaces having a partially cylindrical shape, various sectional shape of the hole(s), and various numbers of the hole(s);

FIG. 6 shows a base material to be drawn and formed and a glass plate as original material of the base material, FIG. 6(A) illustrating a glass plate, FIG. 6(B) illustrating a base material prepared by working the glass plate of FIG. 6(A), FIG. 6(C) illustrating a glass plate, and FIG. 6(D) illustrating a base material prepared by working the glass plate of FIG. 6(C);

FIG. 7 schematically shows a process of drawing a base material, FIG. 7(A) showing a process of drawing a base material having no hole, and FIG. 7(B) showing a process of drawing a base material having a hole(s);

DETAILED DESCRIPTION OF THE INVENTION

Embodiments of optical fiber array substrates according to the present invention will be described with reference to the drawings.

Figure 1A:
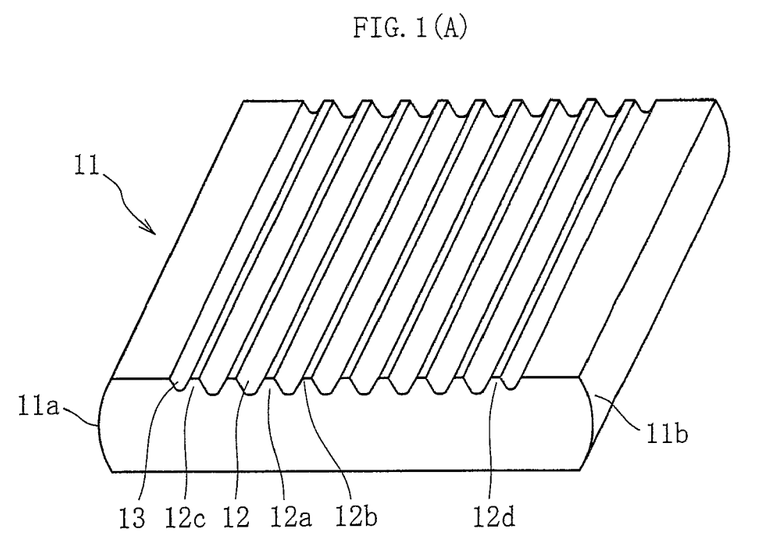
Figure 1B:
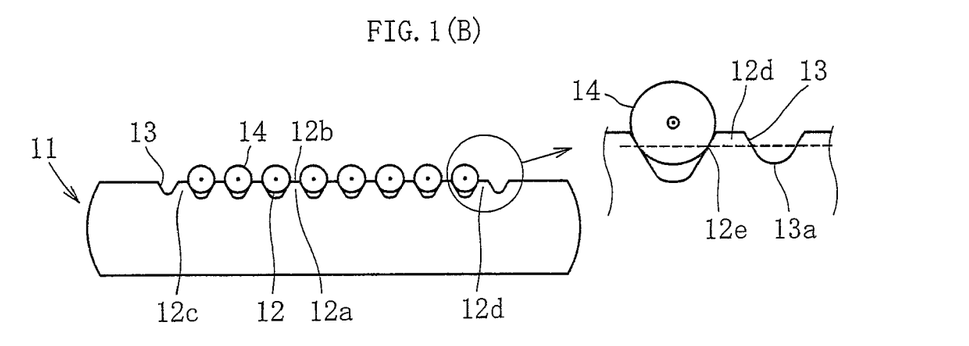

FIG. 1 shows an optical fiber array substrate 11 according to a first embodiment. The optical fiber array substrate 11 is, for example, made of transparent borosilicate glass and has, in one surface thereof, eight grooves (e.g. V-grooves) 12 for securing eight optical fibers 14 aligned in parallel to each other, and V-shaped side grooves 13 formed outside of the respective outermost V-grooves 12 located at the opposite sides of the substrate 11. Further, in this embodiment, the side surfaces 11a and 11b of the substrate 11 that are parallel to the grooves 12 are respectively convex partially cylindrical surfaces each having the center of curvature at the center of the substrate 11.

A flat surface 12b is formed at each of the apexes of the ridges defining the V-grooves 12. The apexes of the outside ridges 12c and 12d defining the outermost V-grooves 12 are at the same height as the apexes of the inside ridges 12a and, as shown in the enlarged view of FIG. 1(B), the height of the bottom 13a of the side groove 13 is lower than that of a contact point 12e between the ridge line of the V-groove 12 and optical fiber 14. Further, in this embodiment, the height of the bottom 13a of the side groove 13 is higher than that of the bottoms of the V-grooves 12. Due to the side grooves 13, apex-side portions of the outside ridges 12c and 12d extending from the contact points 12e with the optical fiber 14 are formed into substantially the same shape as apex-side portions of the inside ridges 12a extending from the contact points 12e with the optical fiber 14.

Figure 1C:
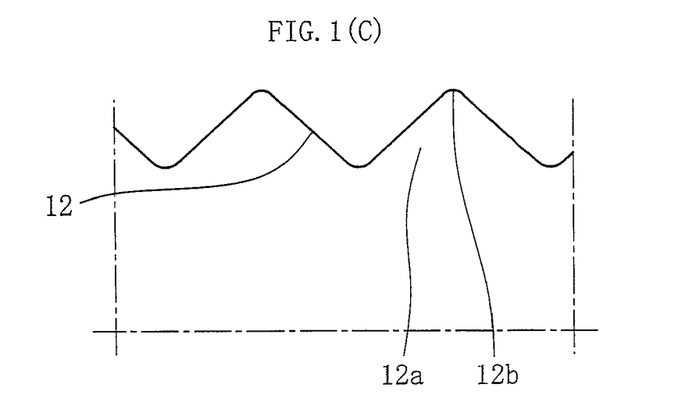
Figure 2A:
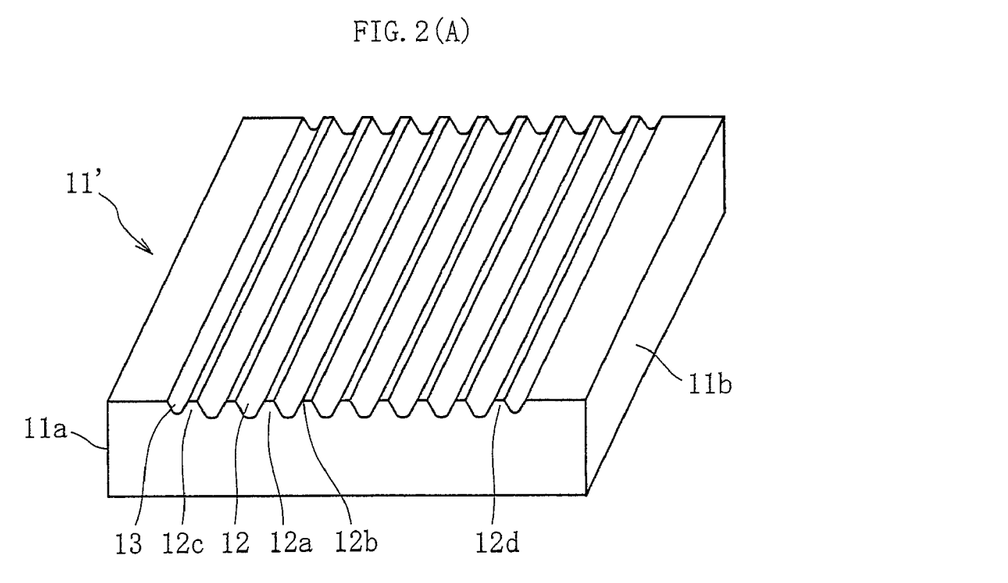
Figure 2B:
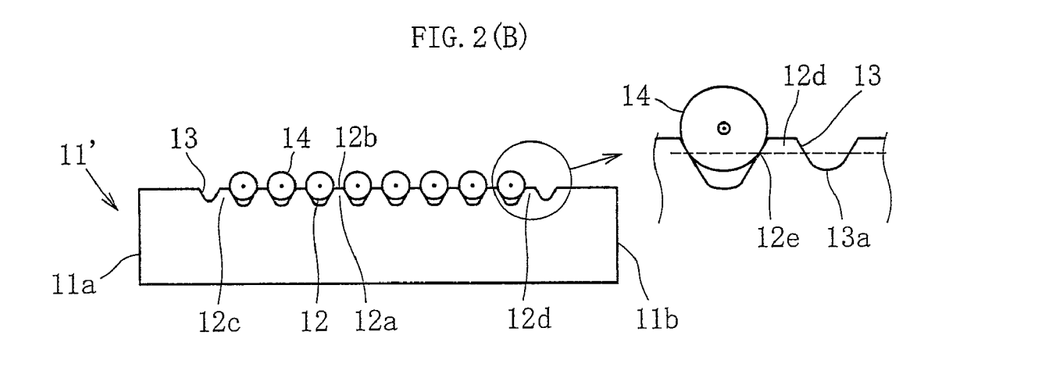
Figure 2C:
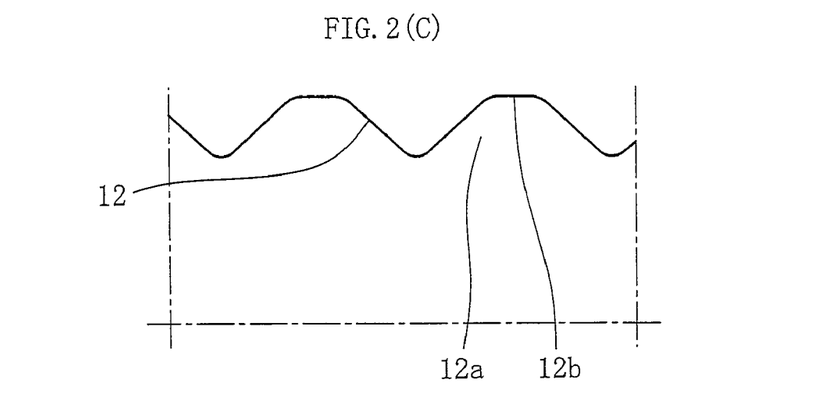

FIG. 2 shows an optical fiber array substrate 11' according to a second embodiment. According to this embodiment, the side surfaces 11a and 11b of the substrate 11' parallel to the grooves 12 are respectively flat surfaces. The other constitutions are the same as the embodiment shown in FIG. 1.

Dimensions of the optical fiber array substrate 11 shown in FIG. 1 were measured. The optical fiber array substrate 11 was fixed such that an end surface thereof could be watched straightly from a measuring microscope, and an image of the shape of the linear V-grooves 12 for securing optical fibers 14 therein was recognized on a screen thorough the measuring microscope having a CCD camera so that an angle of the valley of each of the linear V-grooves 12, and intervals between the V-grooves 12 were measured. As a result, the angle of the valley of each of the V-grooves 12 was 98 degrees, the interval between the V-grooves 12 was 127 μm±0.5 μm, and the variation in height of the V-grooves 12 was within the range of ±0.5 μm. The angle of the valley of each of the side grooves 13 was 98 degrees.

Further, when the cross section of the optical fiber array substrate 11 was observed while being enlarged by about 250 times, as shown in FIG. 1(C), the length of the flat surface 12b formed at the apex of the ridge 12a of the V-groove 12 was about 10 µm.

Figure 4A:
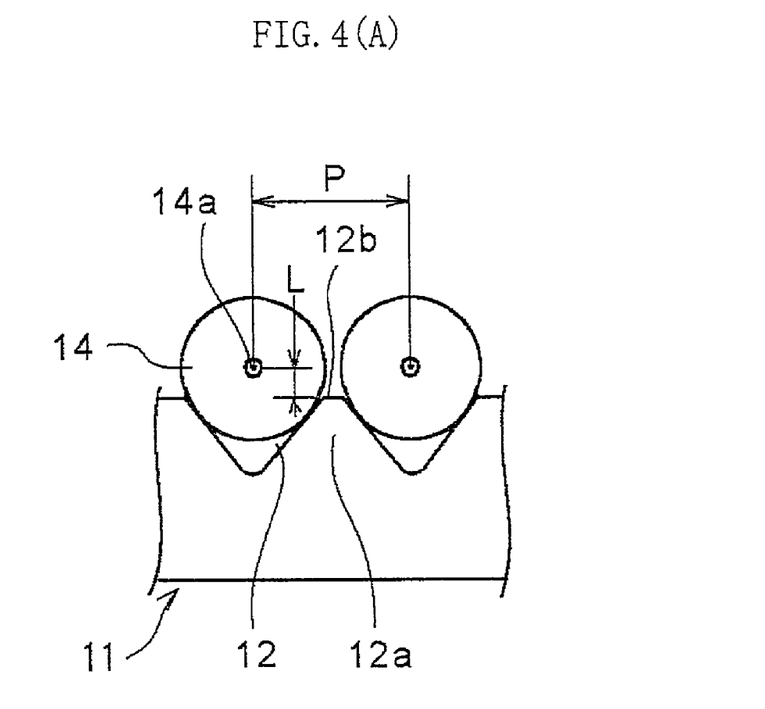

Still further, in the optical fiber array substrate 11 as shown in FIG. 4(A), the interval P between the V-grooves 12 was 127 µm±0.5 µm, and a distance L from the line connecting the centers 14a of the optical fibers 14 secured in the V-grooves 12 at the interval P to the flat surface 12b of the ridge 12a was 20 µm within 52.5 µm.

Figure 3A:
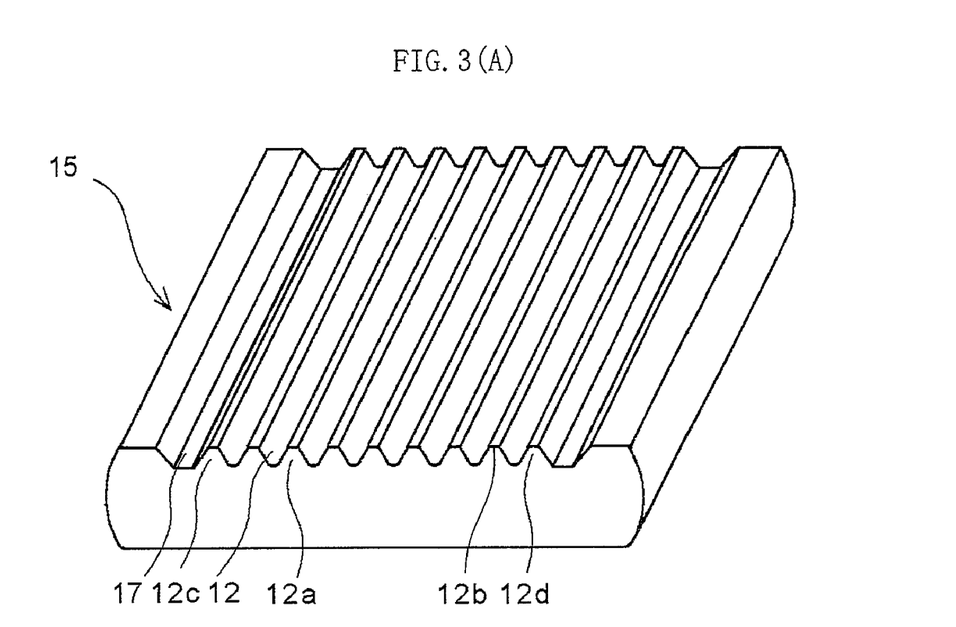
Figure 3B:
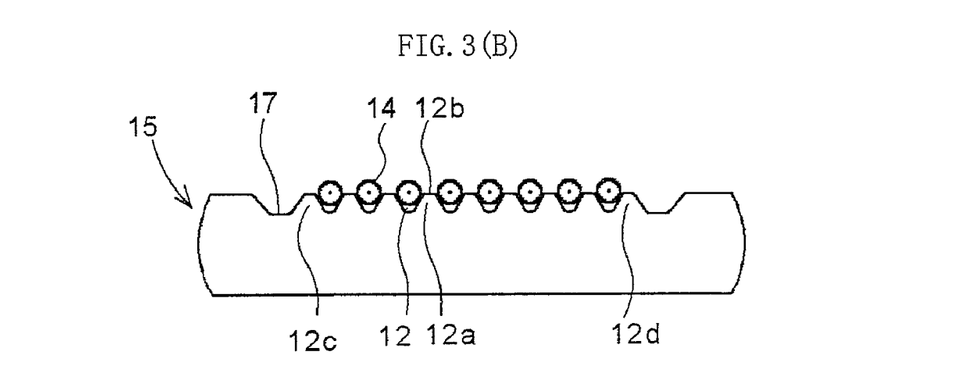

FIG. 3 shows an optical fiber array substrate 15 according to a third embodiment. In this embodiment, V-shaped side grooves 17 are formed outside of the respective outermost V-grooves 12 located at the opposite sides of the substrate 15, and the height of the bottom of each of the side grooves 17 is substantially the same as the height of the bottom of the V-groove 12. Due to the side grooves 17, the outside ridges 12c and 12d are formed so as to have substantially the same dimension and shape as those of the inside ridges 12a. The other constitutions are the same as the embodiment shown in FIG. 1.

Dimensions of the optical fiber array substrate 15 shown in FIG. 3 were measured in the same manner as mentioned in the above. As a result, the angle of the valley of each of the V-groove 12 was 96 degrees, the interval between the V-grooves 12 was 250 µm±0.5 µm, and variation in height of the V-grooves was within the range of ±0.5 µm. Further, as shown in FIG. 4(B), the interval P between the V-grooves 12 was 250 µm±0.5 µm, and the distance L from the line connecting the centers 14a of optical fibers 14 secured in the V-grooves 12 to the flat surface 12b of the ridges 12a was 30 µm within 52.5 µm.

Figure 3C:
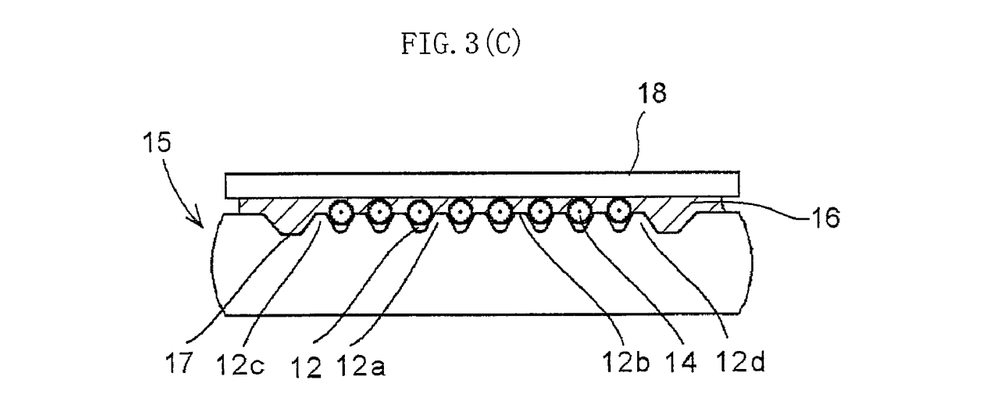
Figure 4B:
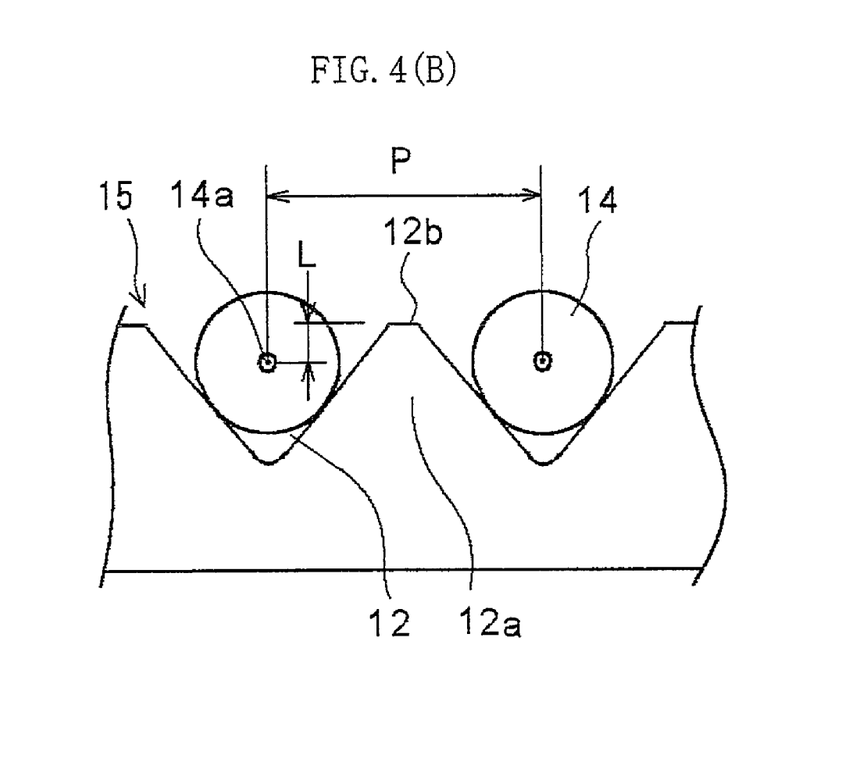

Further, as shown in FIG. 3(C), eight optical fibers 14 were adhered to the optical fiber array substrate 15 by means of adhesive 16 and pressed by a glass plate 18 to secure the same. The optical fiber array substrate 15 and the glass plate 18 were both 2.8 mm wide and 10 mm deep. The amount of adhesive required to adhere all of the eight optical fibers 14 was about $1.0 \times 10^{-3}$ ml. When a little greater amount of adhesive was used, however, the adhesion could be done neatly without running off of the adhesive from the side surfaces of the optical fiber array substrate 15. If no side groove 17 is provided to serve as a reservoir for retaining the adhesive 16, it will be necessary to control the adhesive amount to not less than about $1.0 \times 10^{-3}$ ml but not more than about $1.4 \times 10^{-3}$ ml. If the adhesive amount is less than $1.0 \times 10^{-3}$ ml, the adhesive 16 may not be able to distribute to all of the eight optical fibers, but if the adhesive amount exceeds $1.4 \times 10^{-3}$ ml, the adhesive 16 may run off from the side surfaces of the substrate 15. This means that, if no side groove 17 is provided to serve as a reservoir for retaining the adhesive 16, the adhesive amount should be controlled within a range of about $0.4 \times 10^{-3}$ ml. On the other hand, when the side grooves 17 are provided to serve as reservoirs for retaining the adhesive 16, the adhesive amount can be controlled to not less than about $1.0 \times 10^{-3}$ ml and not more than about $1.7 \times 10^{-3}$ ml. In other words, the control range of the adhesive amount can be enlarged to about $0.7 \times 10^{-3}$ ml.

FIG. 5 shows optical fiber array substrates 20 according to a fourth embodiment. The optical fiber array substrate 20 is made, for example, of transparent borosilicate glass, and has in one surface thereof, eight grooves 22 (e.g. V-grooves) for securing eight optical fibers aligned in parallel to each other, and V-shaped side grooves 23 formed outside the respective outermost V-grooves 22 located at the opposite sides of the substrate 20. For example, the intervals between the V-grooves 22 and the intervals between the V-groove 22 and the side groove 23 are both 250 µm. In this embodiment, the side surfaces 20a and 20b of the substrate 20 parallel to the V-grooves 22 are respectively convex partially cylindrical surfaces. In addition, a hole(s) substantially parallel to the V-grooves 22 is provided in the interior of the substrate 20.

Figure 5A:
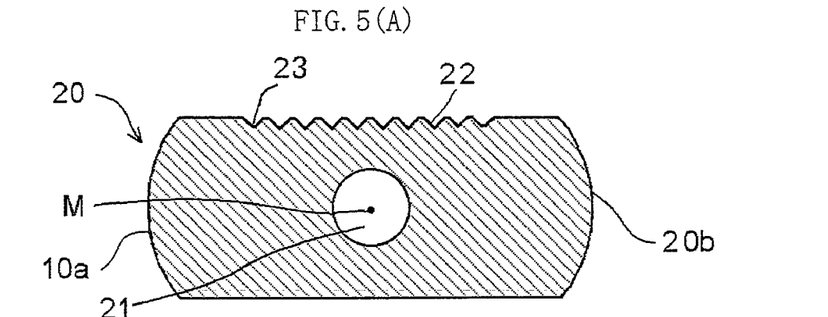
Figure 5B:
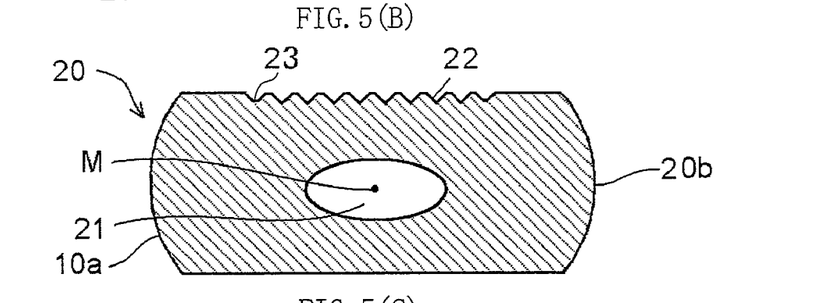
Figure 5C:
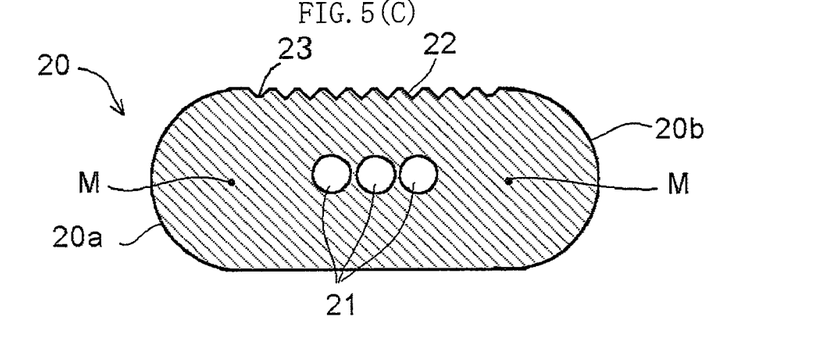
Figure 5D:
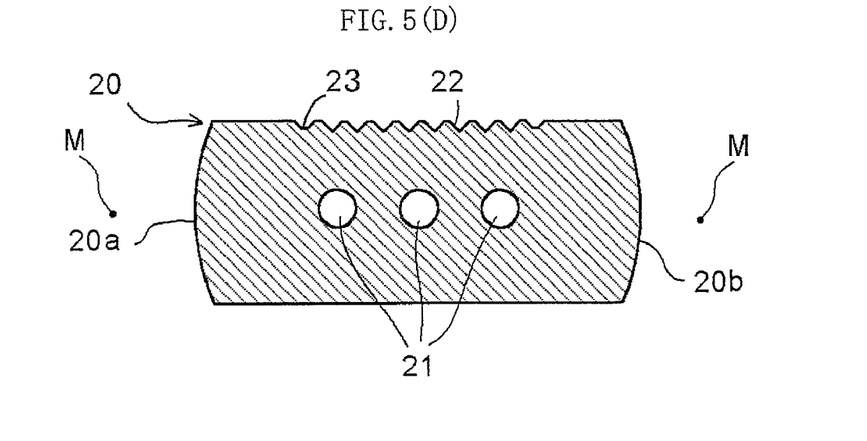

In the examples as shown in FIGS. 5(A) and 5(B), the respective centers of curvature M of the side surfaces 20a and 20b are located at the center of the substrate 20. In the example as shown in FIG. 5(C), the respective centers of curvature M of the side surfaces 20a and 20b are offset from the center of the substrate 20 and located in the interior of the substrate 20. Further, in the example as shown in FIG. 5(D), the respective centers of curvature M of the side surfaces 20a and 20b are offset from the center of the substrate 20, and located in the exterior of the substrate 20. It should be noted that, although not shown in the drawings, each of the side surfaces 20a and 20b is not limited to a convexly rounded surface having a single curvature but may be a composite of convexly rounded surfaces having different curvatures.

For example, the shape of the hole(s) 21 substantially parallel to the V-grooves 22 may be substantially circular in cross section as shown in FIG. 5(A), or substantially elliptical in cross section as shown in FIG. 5(B). Alternatively, the holes 21 may consist of three holes which are substantially circular in cross section and arranged close to each other in the central portion below the region where the V-grooves 22 are formed as shown in FIG. 5(C), or the holes 21 may consist of three holes which are substantially circular in cross section and arranged such that one is located at the central portion below the region where the V-grooves 22 are formed and the other two are located respectively at the opposite end portions below the region. The hole 21 passes through the interior of the substrate 20 and opens at the opposite end surfaces of the substrate 20.

In the examples shown in FIGS. 5(A), 5(B), and 5(C), the concavity in one surface of the substrate 20 where the V-grooves 22 are provided is substantially eliminated by increasing the gas pressure (pressurizing) in the interior of the hole(s) 21 during the drawing process so as to correct the one surface of the substrate 20. Further, in the example shown in FIG. 5(D), the concavity in the one surface of the substrate 20 where the V-grooves 22 are provided is substantially eliminated by increasing the air pressure (pressurizing) in the interior of the hole 21 at the central portion while decreasing the air pressure (depressurizing) in the interior of the two holes 21 at the opposite sides during the drawing process so as to correct the one surface of the substrate 20.

Dimensions of the optical fiber array substrate 20 as shown in FIG. 5 were measured in the same manner as mentioned in the above. As a result, the intervals between the V-grooves 22 were 250 µm±0.5 µm for all the configurations in FIGS. 5(A) through 5(D). Variation in height of the V-grooves 22 was within the range of ±0.5 µm as for the configurations in FIGS. 5(A) and 5(B), while being within the range of ±0.4 µm as for the configurations in FIGS. 5(C) and 5(D).

Next, an embodiment of a method for producing an optical fiber array substrate according to the present invention will be described with reference to the drawings.

Figure 6A:
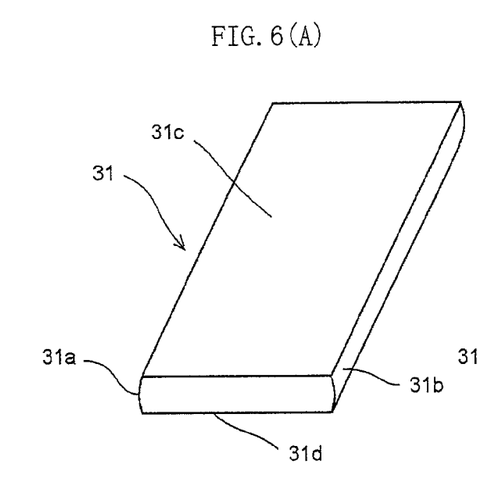
Figure 6B:
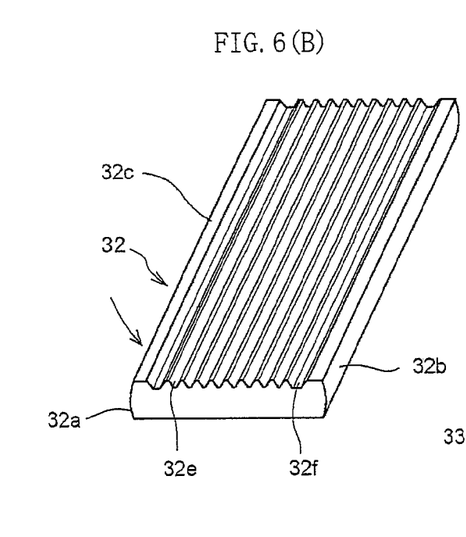

Firstly, as shown in FIG. 6(A), a cylindrical material made of borosilicate glass was worked into a glass plate 31 having a pair of flat surfaces 31c and 31d while leaving side surfaces 31a and 31b as partially cylindrical surfaces. Thereafter, one surface 31c of the glass plate 31 was worked to produce a base material 32 as shown in FIG. 6(B). The one surface 32c of the base material 32 has been worked to have eight linear grooves 32e, which will be optical fiber securing V-grooves after a forming, each having an angle of 90 degrees at the valley thereof, and side grooves 32f at the outside of the grooves 32e. The side surfaces 32a and 32b of the base material 32 are convexly partially cylindrical surfaces.

Figure 7A:
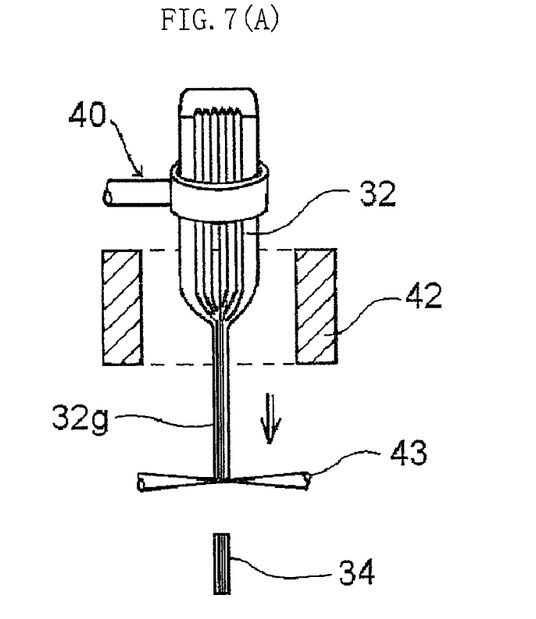

As shown in FIG. 7(A), the base material 32 was then attached to a drawing device 40, and heated by an electric furnace 42. A draw formed portion 32g coming out of the electric furnace 42 was drawn by drive roller(s) not shown, and controlled to a fixed outer diameter while the diameter across the side surfaces of the draw formed portion 32g being measured by laser light not shown to obtain a formed body having the same cross sectional shape and cross sectional dimensions as those of an optical fiber array substrate to be produced.

Figure 8A:
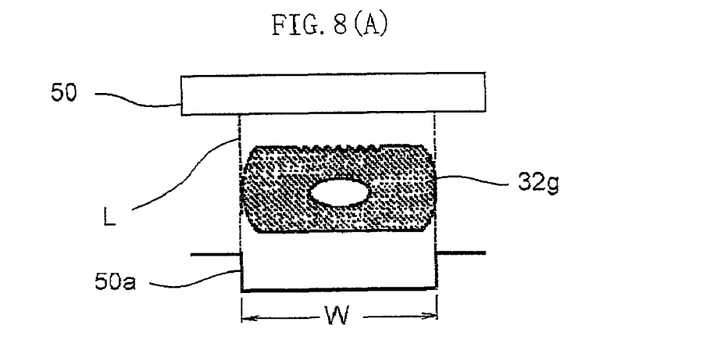
FIG. 8 schematically shows various aspects of dimensional measurement of drawn and formed bodies that have been formed from a base material.
Figure 8B:
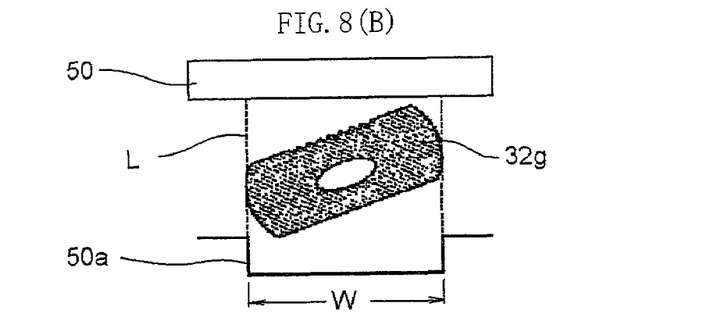

During this drawing process, as shown in FIGS. 8(A) and 8(B), the width W between the side surfaces (the diameter of the partially cylindrical surfaces) of the draw formed portion 32g is measured by a signal 50a from a photo detector due to laser light L from a measuring device 50. When the cross sectional shape of the side surfaces of the draw formed portion 32g are convexly rounded shape, particularly partially cylindrical surfaces, the width (the diameter of the partially cylindrical surfaces) W can be measured accurately even if the draw formed portion 32g is rather oblique during the drawing process. Therefore, with controlling the dimension of the width (the diameter of the partially cylindrical surfaces) W with accuracy, the dimension of the draw formed portion 32g and hence of the resulting optical fiber array substrate can be controlled precisely.

Figure 8C:
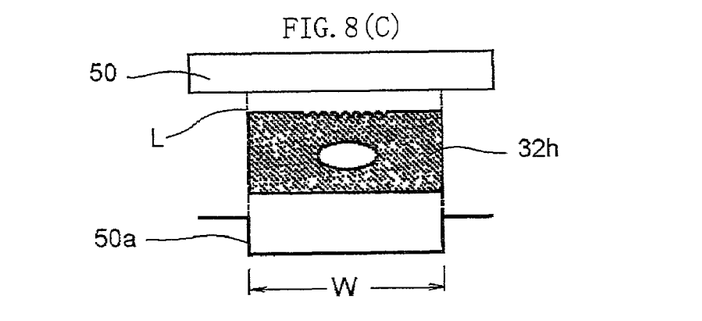
Figure 8D:
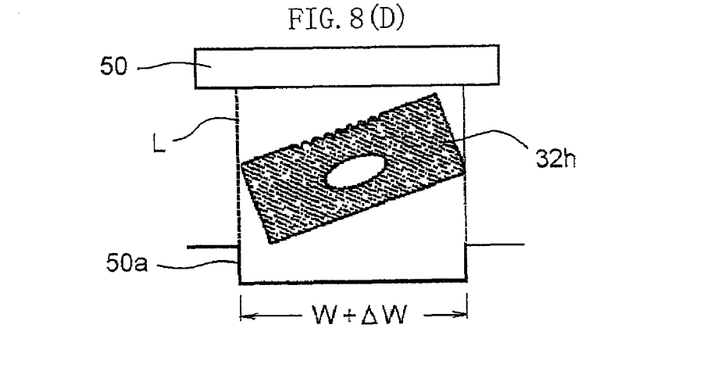

On the contrary, as shown in FIG. 8(C), in case when the side surfaces of the draw formed portion 32h are flat surfaces, since the width W will vary largely to (W+ΔW) even if the draw formed portion 32h is slightly oblique during the drawing process, correct dimensional information may not be obtained. Consequently, it may be difficult to control the dimensions so that the yield may be lowered.

Then, the formed body formed by the drawing was cut by means of a cutter 43 into a length of 250 mm to obtain a longer body 34. The longer body 43 thus obtained was cut precisely into a predetermined length to thereby obtain the optical fiber array substrate 11 as shown in FIG. 1.

Further, the rotational speed of the drive roller(s), not shown, of the drawing device 40 was varied to produce, from the same base material 32, an optical fiber array substrate in which the interval between V-grooves was 250 μm. In the optical fiber array substrate thus produced, the angle of the valley each of the V-grooves was 96 degrees, the interval between the V-grooves was 250 μm±0.5 μm, and the variation in height of the optical fibers 14 secured in the V-grooves was in the range of ±0.5 μm.

Further, as a result of measuring the surface roughness of the optical fiber array substrate thus produced, the Ra value of the surface roughness was 0.04 μm. This means that the surfaces of the optical fiber array substrate were fire-polished by the heat softening thereof so that the surfaces become smooth.

In case when the optical fiber array substrate is reinforced by forming a compressive stress layer in the surface thereof by means of a quenching method, the formed body for the optical fiber array substrate that has come out of the furnace with predetermined cross sectional dimensions and shape is quenched by spraying cold blast or a refrigerant thereto so that a compressive stress layer is generated in the glass surface.

Further, in case where the surface of the optical fiber array substrate is reinforced by ion exchange, a longer body of about 250 mm for optical fiber array substrate is immersed in molten salt of $KNO_3$ maintained at about 400 deg C. in an ion exchange tank for about 10 hours. $KNO_3$ is then washed off. Thereby, it is able to obtain such a longer body for optical fiber array substrate that is increased in breakage resistance as a mechanical strength measured by the three-point bending test, more than double that of an untreated one. With the ion exchange treatment, the practical strength of the glass can be enhanced by replacing alkali ions ($Na^+$) in the glass by alkali ions ($K^+$) having a greater ionic radius at a temperature lower than the annealing temperature to thereby generate a layer with compression stress of about 100 MPa in the glass surface.

Figure 6C:
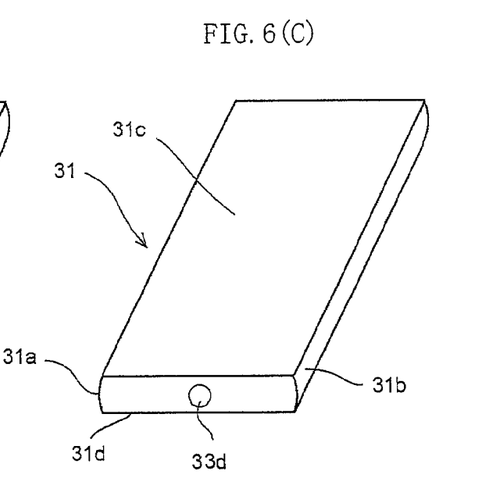
Figure 6D:
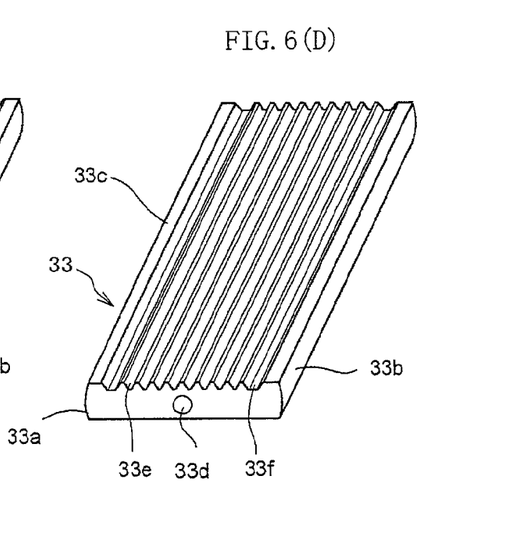

Further, according to another embodiment of the producing method, a cylindrical material made of borosilicate glass was worked into a glass plate 31, as shown in FIG. 6(C), by forming two flat surface 31c and 31d parallel to each other, while leaving side faces 31a and 31b as partially cylindrical surfaces, and forming a hole 33d having a substantially circular cross section and passing through the interior of the glass plate 31. One surface 31c of the glass plate 31 was then worked to produce a base material 33 as shown in FIG. 6(D). The one surface 33c of the base material 33 has been worked to have eight linear grooves 33e, which will be optical fiber securing V-grooves after a forming, each having an angle of 90 degrees at the valley thereof, and side grooves 33f at the outside of the grooves 33e. The side surfaces 33a and 33b of the base material 33 are convexly partially cylindrical surfaces. In addition, a hole 33d is located below the central portion of the one surface 33c of the base material 33.

Figure 7B:
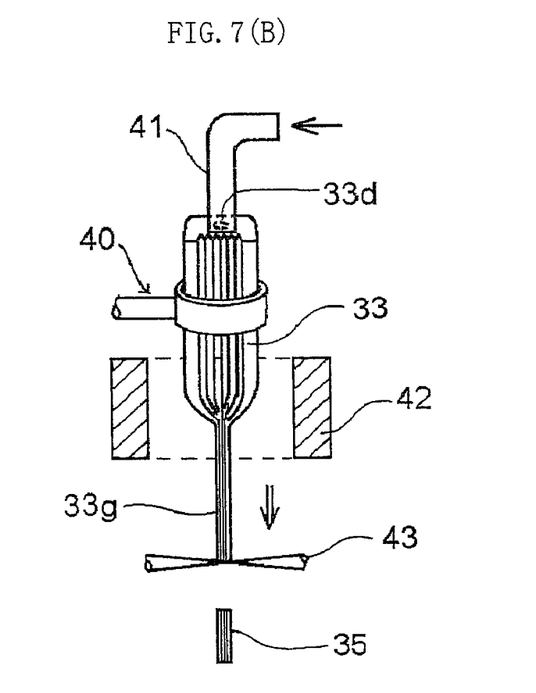

As shown in FIG. 7(B), the base material 33 was then attached to a drawing device 40, and heated by an electric furnace 42 while increasing the gas pressure (i.e. pressurizing) in the interior of the hole 33d by supplying pressurized gas into the hole 33d of the base material 33 through a pipe 41. A draw formed portion 33g coming out of the electric furnace 42 was drawn by drive roller(s) not shown, and controlled to a fixed outer diameter while the diameter across the side surfaces of the draw formed portion 33g being measured by laser light not shown, to obtain a formed body having the same cross sectional shape and cross sectional dimensions as those of an optical fiber array substrate to be produced. Then, the formed body was cut by means of a cutter 43 into a length of 250 μm to obtain a longer body 35. The longer body 35 thus obtained was cut precisely into a predetermined length to thereby obtain an optical fiber array substrate 20 as shown in FIG. 5(A).

In the producing method as described above, the glass plate 31 (base material 33) was made of crystallized glass as shown in Table 1 below, and two types of optical fiber array substrates made of crystallized glass, namely one with 127 μm intervals between V-grooves and the other one with 250 μm intervals between V-grooves were prepared. Dimensional measurement was performed on these two types of optical fiber array substrates made of crystallized glass in the same manner as the above, resulting in that the interval P between the V-grooves was 127 μm±0.5 μm for the former type whereas 250 μm±0.5 μm for the latter, and the variation in height of optical fibers secured in the V-grooves was within the range of ±0.5 μm for both. Thus, the both optical fiber array substrates exhibited high accuracies in dimensions and shape. In addition, the optical fiber array substrates made of crystallized glass exhibited improved breakage resistance compared with those made of glass, while the polishing performance thereof was as good as that of silica optical fibers.

In the embodiments described above, by the formation or the side grooves at the outside of the optical fiber securing grooves, at least the apex-side portion, extending from the contact point with the optical fiber, of the outside ridge defining the outside optical fiber securing groove is made to have substantially the same shape as the apex-side portion, extending from the contact point with the optical fiber, of the inside ridge, or alternatively the whole portion of the outside ridge of the groove is made to have substantially the same shape as the whole portion of the inside ridge. However, the present invention is not limited to such configuration, and it is also possible that the height level of the outside lower edge of the outside ridge of the groove is maintained equally up to the side surface of the substrate, so that the region extending from the outside ridge to the side surface of the substrate becomes wholly evenly lower than the apex of the ridge. Further, according to the embodiments described above, the optical fiber array substrate with V-groove valleys having an angle of 98 or 96 degrees from the base material with V-groove valleys having an angle of 90 degrees is produced. However, the angle of groove of the optical fiber array substrate may be 90 or 100 degrees instead. Further, the cross sectional shape of the optical fiber securing grooves is not limited to the V-shape, and it may be rectangular or other shape.

of the substrate even when the diameter is obliquely measured in the cross sectional shape of the side surfaces.

2. The optical fiber array substrate according to claim 1, wherein a hole substantially parallel to the grooves is provided in the interior of the substrate.

3. The optical fiber array substrate according to claim 1, wherein a side groove with a predetermined volumetric capacity is provided at the outside of the outside ridge defining the outside optical fiber securing groove.

4. The optical fiber array substrate according to claim 1, wherein the apexes of the ridges defining the optical fiber securing grooves are flat surfaces.

5. The optical fiber array substrate according to claim 1, wherein the distance from the apexes of the ridges to a line connecting the centers of the optical fibers mounted in the grooves is less than or equal to 52.5 µm.

6. The optical fiber array substrate according to claim 1, wherein the substrate is produced by drawing a base material made of glass or crystallized glass in which crystals are precipitated in amorphous glass.

7. The optical fiber array substrate according to claim 1, wherein at least an apex-side portion, extending from a contact point with an optical fiber, of an outside ridge defining an outside optical fiber securing groove has substantially the same shape as an apex-side portion, extending from the contact point with the optical fiber, of an inside ridge.

8. The optical fiber array substrate according to claim 7, wherein the outside ridge defining the outside optical fiber securing groove has substantially the same shape as the inside ridges.

TABLE 1

| | | Sample No. | | | | |
|---|---|---|---|---|---|---|
| | | 1 | 2 | 3 | 4 | 5 |
| glass composition (mass %) | $SiO_2$ | 57.8 | 66.3 | 67.4 | 64.3 | 65.9 |
| | $Al_2O_3$ | 24.6 | 18.2 | 16.6 | 18.0 | 18.2 |
| | $Li_2O$ | 2.7 | 2.3 | 2.3 | 2.5 | 2.0 |
| | $K_2O$ | 7.0 | 3.4 | 3.5 | 5.0 | 3.4 |
| | $TiO_2$ | 2.8 | 1.8 | 3.0 | 3.0 | 1.5 |
| | $ZrO_2$ | 3.2 | 1.8 | 1.8 | 2.0 | 1.8 |
| | ZnO | 1.0 | 3.1 | 2.0 | 3.1 | 3.8 |
| | MgO | — | 1.0 | 1.0 | 1.0 | 1.5 |
| | CaO | — | — | — | 0.4 | 0.6 |
| | BaO | — | — | — | 0.5 | 1.4 |
| | $B_2O_3$ | — | — | 2.0 | — | — |
| | $Na_2O$ | 0.4 | — | — | — | — |
| | $P_2O_5$ | — | — | 0.4 | — | — |
| | $As_2O_3$ | 0.5 | — | — | 0.2 | 0.1 |
| | $Bi_2O_3$ | — | 2.1 | — | — | — |
| crystallization condition (° C.) | | | | | | |
| nucleus formation temperature | | 780 | 780 | 790 | 780 | 780 |
| crystal growth temperature | | 1000 | 1000 | 980 | 1050 | 1000 |
| main crystal | | β-quartz solid solution | β-spodumen solid solution | β-spodumen solid solution | β-spodumen solid solution | β-spodumen solid solution |

The invention claimed is:

1. An optical fiber array substrate made of glass or crystallized glass in which crystals are precipitated in amorphous glass, the substrate having a plurality of optical fiber securing grooves formed therein, wherein a cross sectional shape of each of side surfaces of the substrate parallel to the grooves is a convexly rounded shape, and each of the side surfaces is formed to be a partially cylindrical surface such that respective centers of curvature of the side surfaces substantially coincide with each other at the center of the substrate so as to maintain a measured diameter of the side surfaces

* * * * *